United States Patent [19]

Warberg

[11] 4,007,382
[45] Feb. 8, 1977

[54] BIPOLAR SIGNAL PROCESSING CIRCUIT

[75] Inventor: John Martin Warberg, Oakville, Canada

[73] Assignee: Canadian National Railway Company, Montreal, Canada

[22] Filed: June 27, 1975

[21] Appl. No.: 590,828

[30] Foreign Application Priority Data

Feb. 12, 1975 Canada .................................. 219887

[52] U.S. Cl. ............................ 307/236; 307/235 K; 307/235 N; 307/235 A; 328/118; 307/147

[51] Int. Cl.² .......................................... H03K 5/20

[58] Field of Search ........ 307/235 A, 235 K, 235 N, 307/236; 328/146, 118, 147, 149

[56] References Cited

UNITED STATES PATENTS

| | | | |
|---|---|---|---|
| 3,478,255 | 11/1969 | Parker et al. | 307/235 N |
| 3,518,560 | 6/1970 | Avignon | 307/236 X |
| 3,753,012 | 8/1973 | Frederiksen et al. | 307/235 N |
| 3,784,921 | 1/1974 | Iadipaolo | 328/146 X |
| 3,862,437 | 1/1975 | Rossell | 307/235 A |
| 3,916,326 | 10/1975 | Woyton | 328/118 |

Primary Examiner—John S. Heyman
Attorney, Agent, or firm—Fetherstonhaugh & Company

[57] ABSTRACT

A bipolar signal is recovered and separated into its positive portion and its negative portion. The incoming bipolar signal and its inverted form are separately compared to a switched threshold. Switching of the threshold from a low standby level to a high level is effected by feedback of the output signals. The circuit generates a switched reference signal which is applied to two comparator circuits, one for the bipolar signal, the other for the inverted bipolar signal, and a hysterisis generator switches the threshold to its high level when a comparator circuit produces an output signal.

5 Claims, 2 Drawing Figures

BIPOLAR SIGNAL PROCESSING CIRCUIT

This invention relates to a method of and a circuit for processing and recovering a bipolar signal.

Information in binary code form is usually converted into a three-level bipolar signal prior to transmission over telephone lines or the like because bipolar signals are easier to transmit on account of the fact that they have no dc component and require a relatively narrow bandwidth. The transmission links cause fading and add noise to the transmitted signal. Accordingly, the receiving station must process and recover the bipolar signal so as to produce a facsimile of the initial two-level binary code signal.

Various circuits have been used for recovering bipolar signals and converting them back to a two-level signal using, for example, a full-wave rectifier and a comparator to which a reference voltage or threshold is applied which is preferably related in amplitude to the peak value of the incoming bipolar signal. When it is desired to separately process the positive and the negative portions of the waveform, two half-wave rectifiers are used, each followed by a threshold detector. Where it is undesirable to use rectifiers, the incoming signal is firstly inverted and is then compared in each of its forms to a suitable threshold.

An object of this invention is to provide a simple bipolar signal processing circuit that eliminates the need for rectifiers.

Another object of this invention is to permit separate processing of the positive and negative components of an incoming bipolar signal.

It is also an object of this invention to provide an automatically adjustable and switched threshold in order to improve the processing circuit's immunity to noise.

In accordance with this invention, a reference voltage is produced which has two possible levels each related to the peak voltage of a bipolar signal. The bipolar signal is inverted and a simultaneous but separate comparison is made of the bipolar signal and its inverted form to the reference voltage. A first output signal is produced whenever the bipolar signal exceeds the reference voltage, and similarly a second output signal is produced when the inverted bipolar signal exceeds the reference voltage, and a feedback from the output signals is used to switch the reference voltage from its low level to its high level for the duration of each output signal.

The invention provides a bipolar signal processing circuit comprising input means for receiving a bipolar signal, an inverter circuit coupled to the input means for inverting the signal, a first comparator circuit having a reference input and having a signal input coupled to the output of the inverter circuit for producing a first output signal when the instantaneous value of the signal at its signal input exceeds the instantaneous value of the signal at its reference input and a second comparator circuit having a reference input and a signal input coupled to the input means for producing a second output signal when the instantaneous value of the bipolar signal applied to its signal input exceeds the instantaneous value of the signal applied to its reference input. A peak voltage generator circuit is connected to the input means for producing a reference voltage whose amplitude approaches the peak voltage of the bipolar signal. An hysterisis generator circuit responsive to the first and second output signals applies the reference voltage to both reference inputs whenever one of the first and second output signals is present and applies a lesser reference voltage to these reference inputs in the absence of output signals. In this circuit, the first output signal represents either a positive portion of the bipolar signal or a negative portion of the bipolar signal, and the second output signal represents the other.

In a particular embodiment of the invention, the hysterisis generator circuit comprises a potential divider connected between the output of the peak voltage genertor and ground and having its junction connected to the reference inputs of the comparator circuits, an electronic switch connected across the grounded leg of the potential divider for substantially reducing the inpedance of the potential divider whenever the switch is in a conductive state, and a logic OR-gate circuit connected to the switch for maintaining the switch conductive during the presence of one of the first and second output signals. In a particular embodiment, the high level reference voltage is approximately 75% of the peak voltage of the incoming bipolar signal and the low level reference voltage is approximately 25% of the peak voltage. The electronic switch may consist of a series connection of a resistor and the collector emitter junction of a NPN transistor whose base is connected to the output of the logic OR-gate circuit. The peak voltage generator circuit may consist of an operational amplifier having one input short-circuited to the output and having a charging circuit connected between the input means of the bipolar signal processing circuit and the other input terminal of the operational amplifier.

An exemplary embodiment of this invention will now be described in connection with the accompanying drawings wherein.

Figure 1:
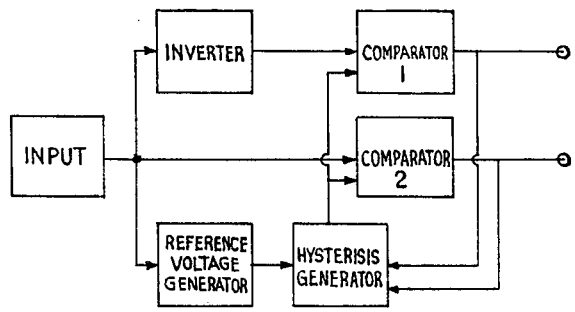
FIG. 1 is a block diagram of a bipolar signal processing and recovering circuit in accordance with this invention.

With particular reference to FIG. 1, the bipolar signal is applied to an input which feeds the signal to comparator 1 through an inverter, to comparator 2 and to the reference voltage generator. The two outputs of the comparators 1 and 2 are applied to a hysterisis generator whose function is to apply the output of the reference voltage generator to the second signal input of each comparator, 1 and 2, while switching from a low reference voltage to a high level whenever an output is present at the output lead of either comparator, 1 and 2.

Figure 2:
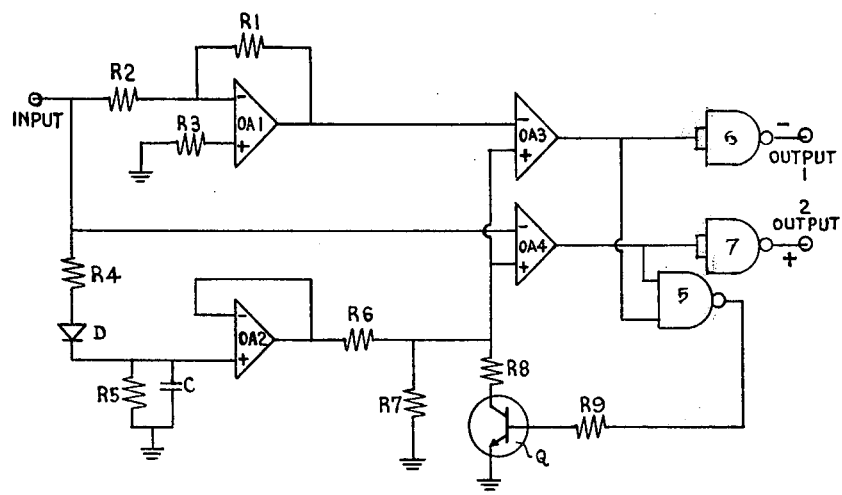
FIG. 2 is a circuit diagram of a particular bipolar signal processing and recovering circuit in accordance with this invention, using a potential divider, a transistor as the electronic switch and a NAND-gate for controlling the conduction of the transistor.

In FIG. 2, a particular bipolar signal processing and recovering circuit is shown in circuit diagram form wherein the inverter consists of an operational amplifier OA 1 whose positive input is grounded by resistor R3 and whose negative lead receives the signal through resistor R2. Bypass resistor R1 is connected between the negative input of operational amplifier OA 1 and the output lead thereof and its resistance is equal to that of resistor R2. The value of R3 is normally equal to approximately (R1 × R2)/R1 + R2).

Operational amplifier OA 3 forms a comparator circuit corresponding to comparator 1 in FIG. 1, and its function is to compare the inverted bipolar signal to a reference voltage as will be discussed hereinafter, and to produce an output signal whenever the inverted bipolar signal exceeds the reference voltage. Comparator 2 from FIG. 1 consists of operational amplifier OA 4 shown in FIG. 2 and its function is to compare the incoming bipolar signal to the reference voltage and to produce an output at output 2 whenever the bipolar signal exceeds the reference voltage.

The reference voltage generator consists of an operational amplifier OA 2 whose negative input is short-circuited to the output of the operational amplifier, and the positive input of operational amplifier OA 2 receives a voltage from a charging circuit which comprises resistor R5 in parallel with capacitor C in connection between the input of the processing circuit and ground. However, a rectifier D is used which passes only the positive portions of the bipolar signal through limiting resistor R4. Consequently, the output of operational amplifier OA 2 is a DC voltage which corresponds approximately to the peak voltage of the bipolar signal and which is used as the reference voltage. The circuit, therefore, provides a reference voltage that is automatically adjusted to the peak voltage of the incoming signal.

The hysterisis generator used in the circuit of FIG. 2 combines a potential divider R6 and R7 connected between the output of the reference voltage generator and ground, an electronic switch in the form of a series connection of resistor R8 and the collector-emitter junction of NPN transistor Q coupled across the grounded leg of the potential divider namely resistor R7. The junction between resistors R6 and R7 is applied in parallel to the positive leads of operational amplifiers OA 3 and OA 4 with the result that when transistor Q is not conductive the reference voltage applied to the comparators 1 and 2 is equal to the output voltage of the reference voltage generator multiplied by the resistance of resistor R7 divided by the sum of the resistances of resistors R6 and R7. However, upon conduction of transistor Q, resistor R7 in effect is connected in parallel with resistor R8 of relatively small resistance with the result that the junction between resistors R6 and R7 switches to a much lower potential.

The operation of transistor Q is controlled by a logic OR-gate circuit 5 whose function is to apply a potential to the base of transistor Q through limiting resistor R1 whenever an output signal is present at output 1 or at output 2. Since OR-gates are not readily available on the market, a NAND-gate is used at 5 which performs the function of a logic OR-gate provided that the inputs are inverted; and the comparators are wired to provide an inverted output so that they may be directly connected to the NAND-gate 5. Two inverters 6 and 7 are required in order to provide output signals at 1 and 2 with the correct polarity. In essence, therefore, the hysterisis generator provides a feedback between outputs 1 and 2 to switch the threshold applied to comparators 1 and 2 between two levels, the high level being applied during the presence of an output signal and corresponding to a substantial percentage of the reference voltage produced by the reference voltage generator, but during the absence of an output, a low level threshold is applied.

In practice the high and low threshold values, which in accordance with this invention are automatically adjusted in relation to the peak voltage of the bipolar signal, will be set at pre-determined levels so as to provide maximum results in any particular application. The percentages found particularly suitable in telephone communication links were a high level of 75% and a low level of 25% of the peak voltage. These levels were obtained in a particular physical embodiment wherein the components included:

R1 = R2 = 10KΩ, R3 = 4.7KΩ, R4 = 3.3KΩ, R5 = 470KΩ, R6 = 12KΩ, R7 = 82KΩ, R8 = 6.8KΩ, and R9 = 39KΩ. Capacitor C had a value of 4.7$\eta$F.

The other components used in the above noted physical embodiment of the circuit shown in FIG. 2 used operational amplifiers OA 1 and OA 2 made by Signetics Corporation serial No. NE 5558, transistor Q by Motorola serial No. MC-3302P, operational amplifiers OA 3 and OA 4 were designated under No. 710, while the NAND-gate is No. 4011.

In accordance with this invention, therefore, the bipolar input signal is passed directly to the inverting input of comparator OA 4, while the inverted bipolar input signal coming out of amplifier OA 1 is passed to the inverted input of comparator OA 3. The non-inverting inputs of comparators OA 3 and OA 4 are connected to a synchronously switched reference voltage which is developed by changing the voltage at the junction of R6, R7 and R8 whenever an output occurs from either of the comparators. This has the effect that when the bipolar signal is rising from 0 to + 1 or falling from 0 to − 1, the reference is high while when the bipolar signal is returning to 0 from + or − 1, the reference is low. Thus a switched threshold is developed from the peak signal voltage which is sometimes referred to as switched threshold or hysterisis and basically serves to enhance the decoding circuits' signal-to-noise immunity. It will be seen that as the switched threshold voltage is essentially a two state signal with a repetition rate comparable to that of the bipolar signal, it contains substantially higher frequency components than the degraded bipolar signal and would therefore require wider bandwidth circuits to process it. In accordance with the invention, the bipolar waveform is inverted and then compared directly with the reference voltage rather than comparing the non-inverted bipolar signal to an inverted and non-inverted switched reference waveform. The result is an extremely simple and effective bipolar signal processing and recovering circuit which could be used advantageously in loop extenders for the transmission of date services over telephone lines.

While a particular embodiment has been described, various changes may be made as will be apparent to those skilled in the art, and it is intended that all such changes be part of this invention which will now be defined in the appended claims.

I claim:

1. A bipolar signal processing circuit for recovering and processing a bipolar signal that could be degraded and for separately representing the positive and the negative portions of said bipolar signal, comprising: input means for receiving a bipolar signal, an inverter circuit coupled to said input means for inverting the bipolar signal, a first comparator circuit having a reference input and having a signal input coupled to the output of said inverter circuit for producing a first output signal when the instantaneous value of the signal at its signal input exceeds the instantaneous value of the signal at its reference input, a second comparator circuit having a reference input and having a signal input coupled to said input means for producing a second output signal when the instantaneous value of the signal at its signal input exceeds the instantaneous value of the signal at its reference input, a peak voltage generator circuit connected to said input means for producing a reference voltage whose amplitude approaches the peak voltage of said bipolar signal, a grounded potential divider connected to the output of said peak voltage generator and having its junction connected to said reference inputs, an electronic switch connected across the grounded leg of said potential divider for substantially reducing the impedance of said potential divider whenever said switch is conductive, and an OR-gate circuit connected to said switch for maintaining said switch conductive during the presence of one of said first and second output signals, whereby said first output signal represents one of said positive and said negative portions of said bipolar signal and whereas said second output signal represents the other one of said portions of said bipolar signal.

2. The processing circuit as defined in claim 1 wherein the voltage applied to said reference inputs during the presence of said first or second output signals is approximately 75% of the peak voltage of said bipolar signal.

3. The processing circuit as defined in claim 2 wherein the voltage applied to said reference inputs during the absence of said output signals is approximately 25% of the peak voltage of said bipolar signal.

4. The processing circuit as defined in claim 1 wherein said electronic switch comprises the series connection of a resistor and the collector-emitter junction of a NPN transistor whose base is connected to the output of said OR-gate circuit.

5. The processing circuit defined in claim 4 wherein said peak voltage generator circuit comprises an operational amplifier whose first input is short-circuited to the amplifier's output, and an R-C charging circuit connected between said input means through a rectifier and the other input of said operational amplifier.

* * * * *